(12) United States Patent
Fellows et al.

(10) Patent No.: US 7,916,302 B2
(45) Date of Patent: Mar. 29, 2011

(54) GYROSCOPE MODE SHIFT DETECTION AND SCALE FACTOR COMPENSATION

(75) Inventors: David O. Fellows, Largo, FL (US); Ying Tan, Arden Hills, MN (US); Timothy J. Callaghan, Roseville, MN (US); Christina M. Schober, St. Anthony, MN (US)

(73) Assignee: Honeywell International Inc., Morristown, NJ (US)

(*) Notice: Subject to any disclaimer, the term of this patent is extended or adjusted under 35 U.S.C. 154(b) by 984 days.

(21) Appl. No.: 11/750,773

(22) Filed: May 18, 2007

(65) Prior Publication Data
US 2010/0014092 A1    Jan. 21, 2010

(51) Int. Cl.
G01B 9/02    (2006.01)

(52) U.S. Cl. ........................................ 356/473

(58) Field of Classification Search ............... 356/473, 356/459, 469, 472, 475, 476
See application file for complete search history.

(56) References Cited

U.S. PATENT DOCUMENTS

| | | | |
|---|---|---|---|
| 4,740,083 A * | 4/1988 | Curby et al. | 356/473 |
| 4,755,057 A * | 7/1988 | Curby et al. | 356/473 |
| 4,783,169 A * | 11/1988 | Matthews et al. | 356/473 |
| 5,076,694 A | 12/1991 | Aronowitz | |
| 5,148,076 A | 9/1992 | Albers et al. | |
| 5,309,459 A * | 5/1994 | Hrovat | 372/34 |
| 5,400,141 A * | 3/1995 | Albers et al. | 356/473 |
| 5,402,232 A * | 3/1995 | Albers et al. | 356/473 |
| 5,450,197 A * | 9/1995 | Karpinski, Jr. | 356/473 |
| 5,450,198 A * | 9/1995 | Killpatrick et al. | 356/473 |
| 5,606,416 A * | 2/1997 | Son et al. | 356/473 |
| 5,838,440 A * | 11/1998 | Beaudet | 356/473 |
| 6,108,358 A * | 8/2000 | Albers et al. | 372/34 |

* cited by examiner

*Primary Examiner* — Gregory J Toatley
*Assistant Examiner* — Scott M Richey
(74) *Attorney, Agent, or Firm* — Fogg & Powers LLC

(57) ABSTRACT

A method for maintaining measurement accuracy of a ring laser gyroscope is disclosed. The method involves periodically measuring a path length control voltage in the ring laser gyroscope over a prescribed temperature range. When a first path length controlled by the path length control voltage deviates at least one wavelength from a nominal path length, the method detects the change in the path length as a mode shift. For each mode shift, the method applies a path length correction to maintain the first path length at a target path length over the prescribed temperature range. The method can apply a correction to a measurement signal output of the ring laser gyroscope by adjusting a calibrated scale factor depending on an actual integer number of wavelengths achieved during a mode shift.

20 Claims, 5 Drawing Sheets

Cavity Backscatter Model

GYROSCOPE MODE SHIFT DETECTION AND SCALE FACTOR COMPENSATION

BACKGROUND

Figure 1:
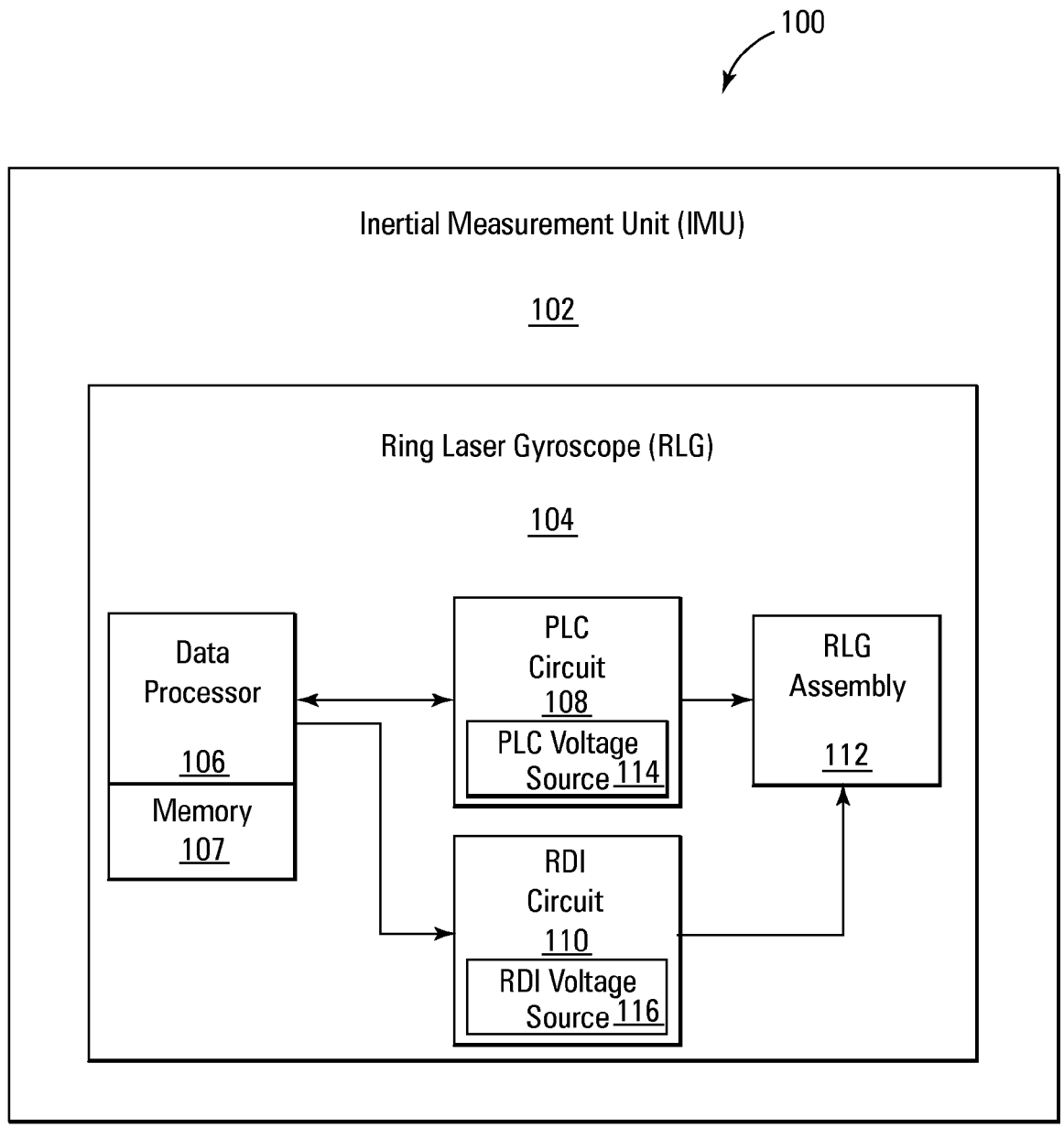

A ring laser gyroscope (RLG) utilizes a laser beam directed to travel in a closed path (that is, a ring) to detect rotation about the axis of the path around which a laser beam is directed. The laser beam is directed in its path by mirrors, typically in a triangular path having three mirrors (with each mirror located at a corner of the triangular path). The RLG is capable of operating over a wide range of temperatures. Frequently, internal elements of the RLG suffer from thermal expansion and contraction due to temperature changes. As a result, these temperature changes expand or contract the internal elements and unless compensated for will cause a change in the path length.

For proper operation, referred to here as a target mode of operation, the RLG requires a laser path maintained at a substantially constant length. The RLG is most accurate when operating in the same target mode determined during calibration. In order to maintain a constant ring laser path length, mirror transducers are commonly employed. Typically, a servo loop is used to control the mirror transducers in order to compensate for the thermal expansion effects which cause the undesirable path length variations. The accuracy of an RLG significantly relies upon the ability to compensate for changes in the total path length and to retain a substantially similar length (in the geometric sense) to the original (that is, the calibrated) path length.

Mode shifts occur when path length control fails to repetitively retain a substantially similar total laser path length compared to the original calibrated path length (for example, after a power interruption the RLG attains and operates at a different integer number of wavelengths from where it operated during the calibration process). These mode shifts result in a discrete RLG scale factor shift. For the purposes of this description, an RLG scale factor is defined as the ratio of actual angle rotated about the gyros input axis to the gyro reported output. For example, typical RLG scale factor units include arc-seconds per count. The RLG scale factor will change a discrete amount for each integer wavelength change in total path length: the scale factor decreases as the total path length increases, and the scale factor increases when the total path length decreases.

To ensure mission success, each RLG system application must operate within specified accuracy requirements. Some missions require very accurate RLG scale factor performance, and are therefore intolerant of the change in scale factor which results from even a single mode shift. Such a project must typically implement frequent guidance system pull and re-calibration intervals in order to ensure accurate scale factor performance. However, the removal of an RLG-based system from a launch vehicle (for example, a spacecraft) for frequent calibrations can lead to significant downtime while the launch vehicle is unavailable. In addition, these frequent calibrations increase product safety and handling costs and system life cycle costs.

For the reasons stated above and for other reasons stated below which will become apparent to those skilled in the art upon reading and understanding the present specification, there is a need in the art for improvements in RLG-based guidance systems which require precision scale factor performance.

SUMMARY

The following specification discusses gyroscope mode shift detection and scale factor compensation. This summary is made by way of example and not by way of limitation. It is merely provided to aid the reader in understanding some aspects of one or more embodiments described in the following specification.

Particularly, in one embodiment, a method for maintaining measurement accuracy of a ring laser gyroscope is provided. The method involves periodically measuring a path length control voltage in the ring laser gyroscope over a prescribed temperature range. When a first path length controlled by the path length control voltage deviates at least one wavelength from a nominal path length, the method detects the change in the path length as a mode shift. For each mode shift, the method applies a path length correction to maintain the first path length at a target path length over the prescribed temperature range.

DRAWINGS

Figure 2:
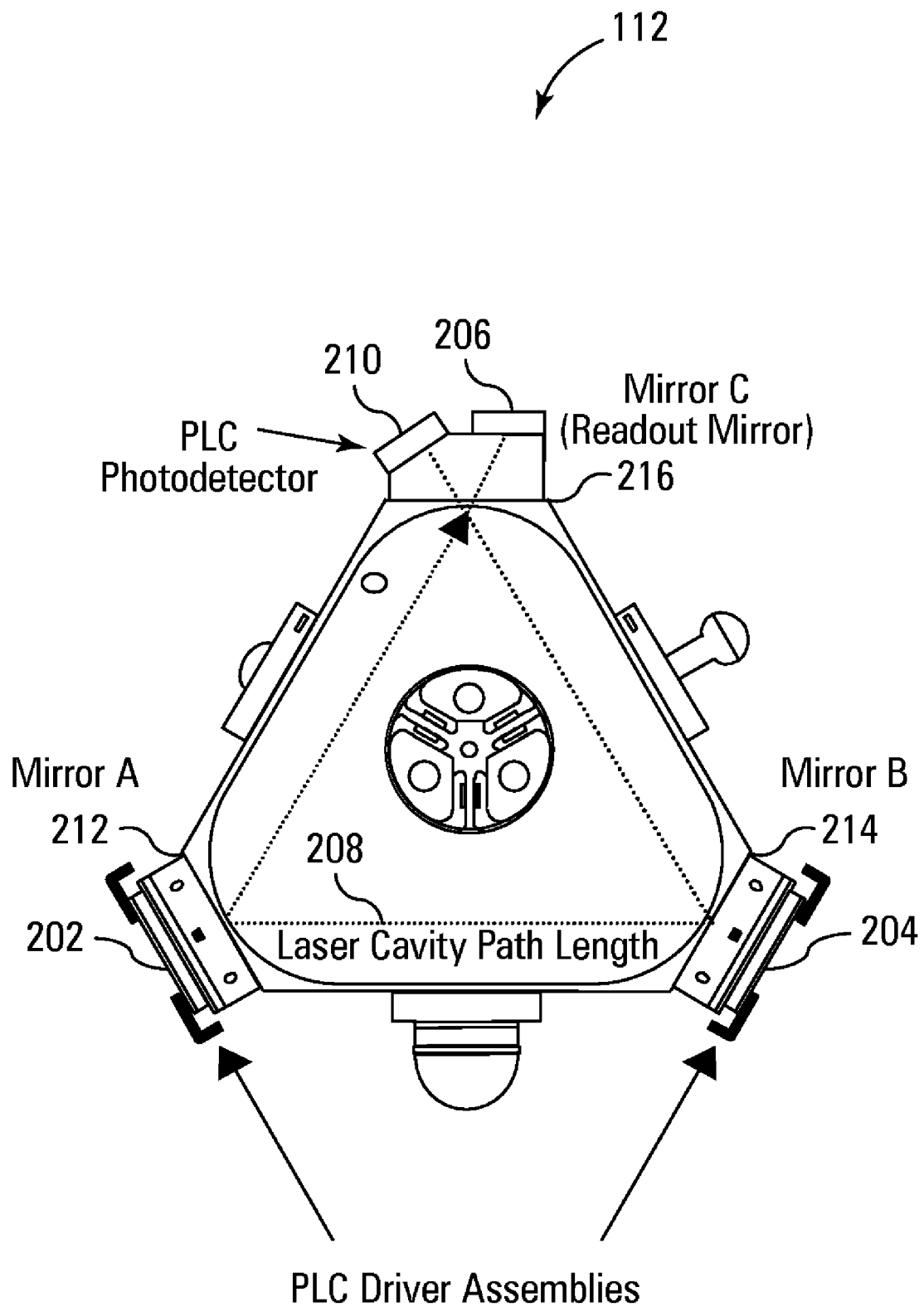
Figure 3:
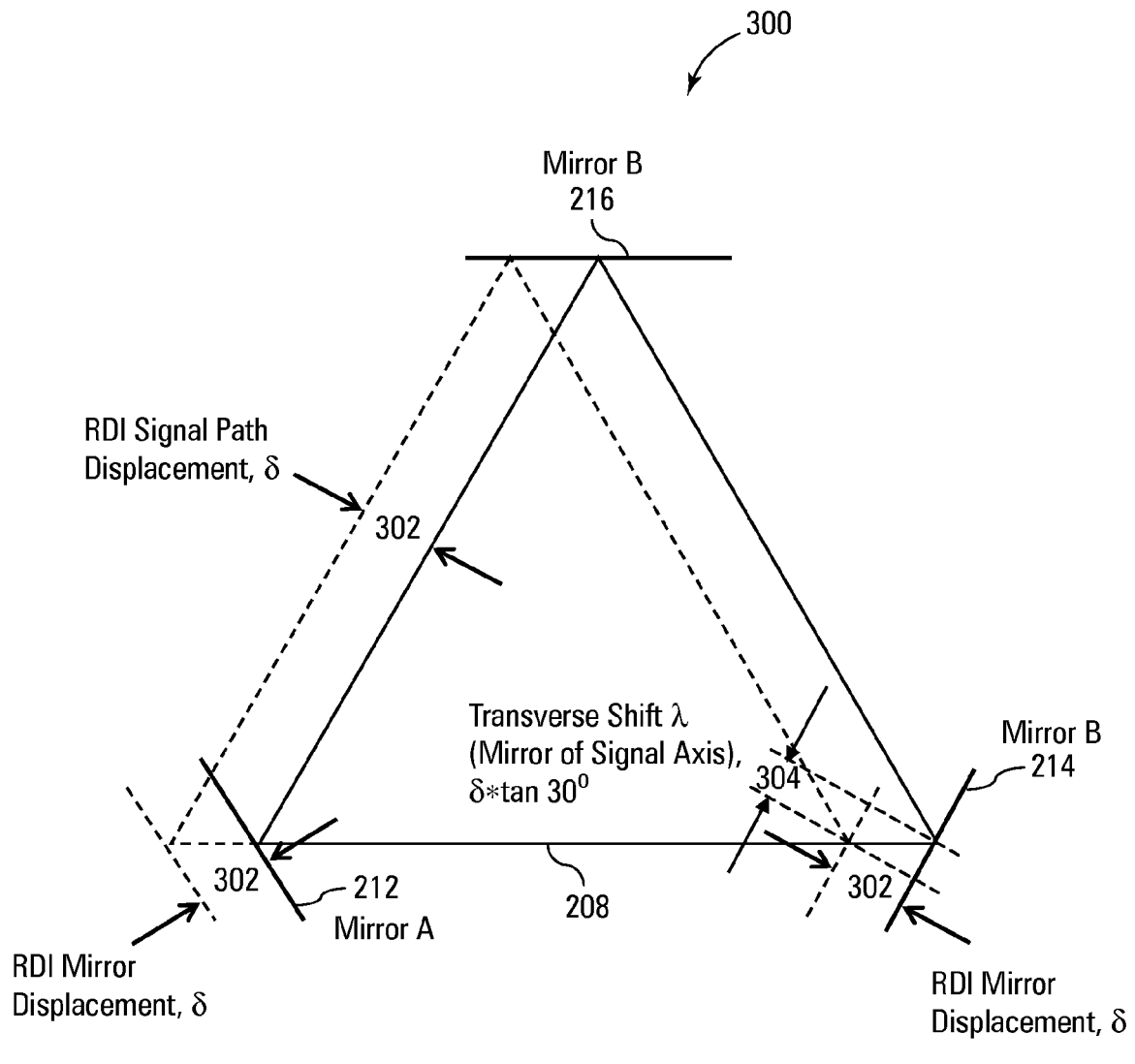
Figure 4:
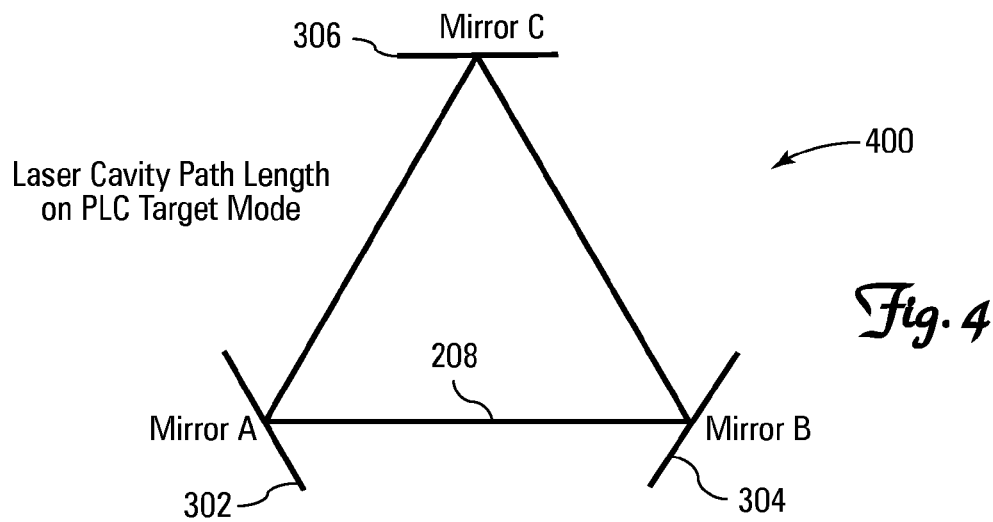
Figure 5:
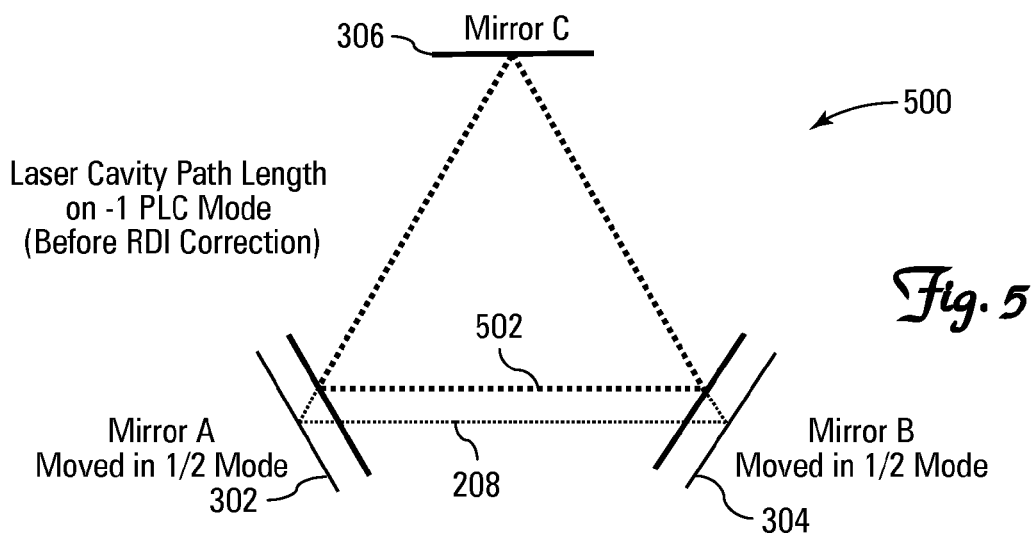
Figure 6:
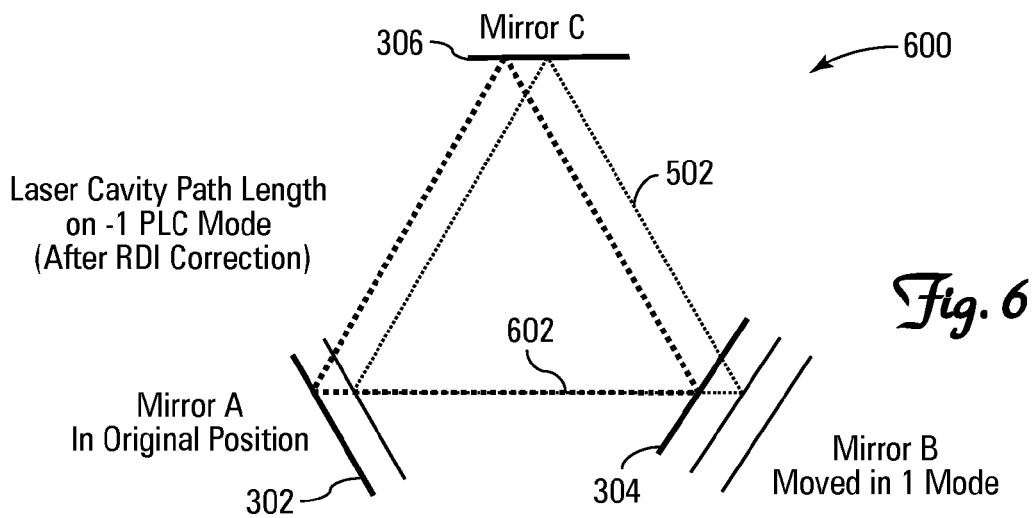
Figure 7:
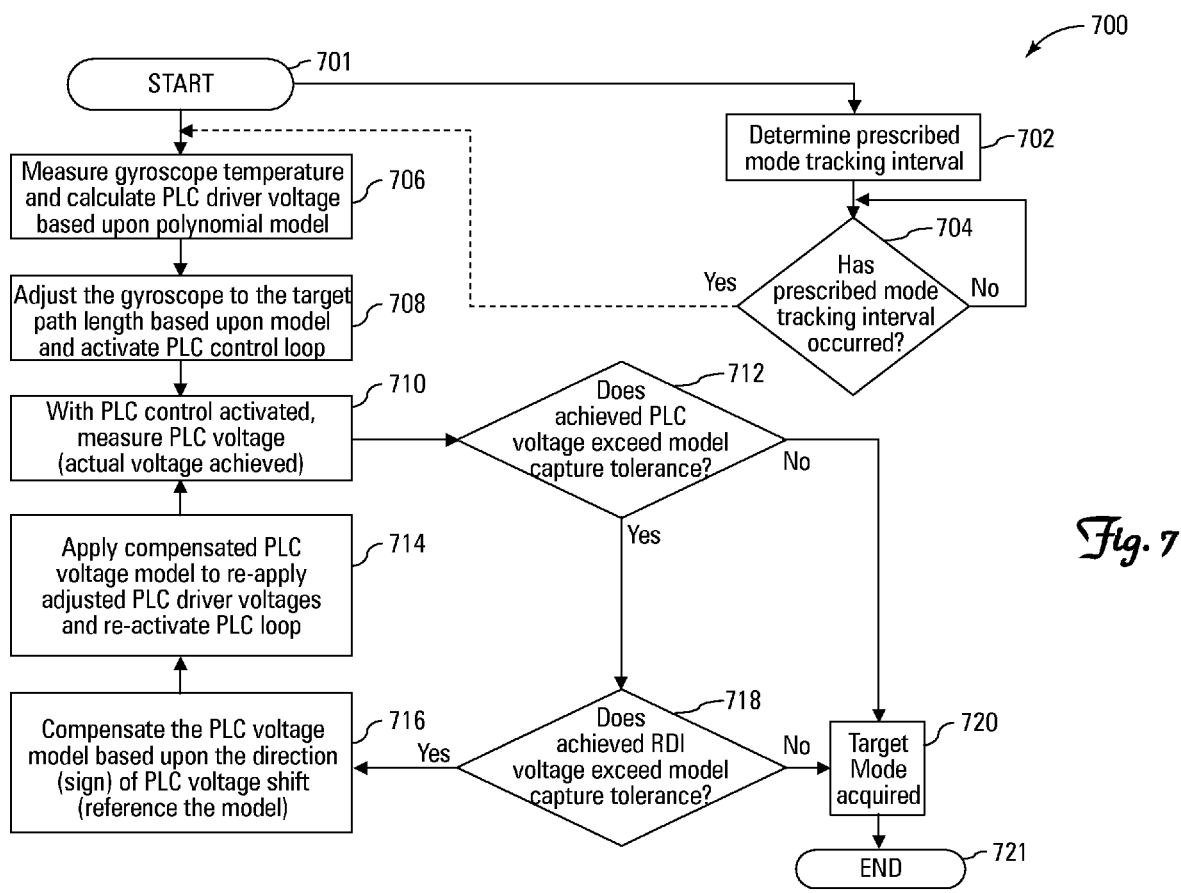

These and other features, aspects, and advantages are better understood with regard to the following description, appended claims, and accompanying drawings where:

FIG. 1 is a block diagram of a guidance system;
FIG. 2 is a block diagram of a ring laser gyroscope in the system of FIG. 1;
FIG. 3 is a block diagram of a cavity backscatter model of the gyroscope of FIG. 2;
FIGS. 4, 5, and 6 are block diagrams of the model of FIG. 3 in operation; and
FIG. 7 is a flow diagram of a method for maintaining measurement accuracy in a ring laser gyroscope.

The various described features are drawn to emphasize features relevant to the embodiments disclosed. Like reference characters denote like elements throughout the figures and text of the specification.

DETAILED DESCRIPTION

The following detailed description describes at least one embodiment for mode shift detection and scale factor compensation in a ring laser gyroscope (RLG) that detects a change (for example, a mode shift) from a calibrated total path length and applies scale factor compensation to ensure that the RLG continues to substantially meet operating accuracy specifications. Advantageously, the mode shift detection and scale factor compensation discussed here improves RLG measurement performance and extends operating intervals by automatically detecting and confirming changes in the calibrated total path length.

To accomplish this, at least two control loops operate within the RLG. A first control loop is for path length control (PLC). The PLC loop applies a voltage input to at least two transducer elements in the RLG with translatable (moveable) mirrors. Each of the transducer elements position the mirrors on, for example, two of three corners of a triangular RLG. The PLC loop adjusts each of the two mirrors forwards and backwards as instructed. The second control loop is for random drift improvement (RDI) that, with respect to the PLC loop, provides an equal but opposite voltage input to the at least two mirrors. The RDI loop does not change the total cavity path length of the RLG. The RDI loop attempts to substantially reduce any cavity back scattering that appears within the internal cavity of the RLG (for example, by adjusting the phase of the two mirrors).

Over an operating life of the RLG, it is desirable that the same PLC voltage level would achieve the same total path length for the internal laser cavity. For example, the RLG is expected to operate on the targeted PLC mode (for example, a calibrated mode) once the PLC loop achieves operation at the same PLC voltage level. For the RLG with two or more mirror position control transducer elements, the RDI voltage can be used as a feedback signal to indicate how to accurately compensate the RLG scale factor in order to achieve the calibrated and desired performance. In one implementation, the RDI feedback voltage is used for a total path length of no more than one integral wavelength (for example, a PLC mode) away from the calibrated mode. Moreover, a path length deviation of greater than one integral wavelength away is not expected from manufacturers skilled in the art of designing and producing mirror control transducer elements for precision RLGs. The ability to accurately compensate and adjust the scale factor using the RDI feedback voltage substantially increases the time between re-calibration of the RLG and, in at least one embodiment, eliminates the need for re-calibration over an operating life of a guidance system that comprises the RLG.

FIG. 1 is a block diagram of an embodiment of a guidance system 100. The system 100 comprises an inertial measurement unit (IMU) 102. The IMU 102 further comprises an RLG 104 in operative communications with the IMU 102. In one implementation, the guidance system 100 comprises a ground-based navigation system. In alternate implementations, the IMU 102 and the RLG 104 are suitable for use in any guidance and navigation system requiring scale factor control including aircraft, marine and space-based navigation systems. The RLG 104 comprises a data processor 106 in communication with a memory 107, and a PLC circuit 108 and an RDI circuit 110 in operative communication with the data processor 106. The RLG 104 further comprises an RLG assembly 112 in operative communication with the PLC circuit 108 and the RDI circuit 110. In the example embodiment of FIG. 1, the data processor 106 is at least one of a microcontroller, an application-specific integrated circuit (ASIC), a field-programmable gate array (FPGA), a field-programmable object array (FPOA), and a programmable logic device (PLD). The PLC circuit 108 comprises at least one PLC voltage source 114 that applies a voltage input to at least two PLC transducer elements in the RLG assembly 112, as further discussed below with respect to FIG. 2.

In one implementation, each of the at least two PLC transducer elements position a mirror on one corner of a triangular-shaped RLG assembly 112, as described in further detail below with respect to FIG. 2. The PLC voltage source 114 adjusts the mirror as instructed by the data processor 106. The RDI circuit 110 comprises an RDI voltage source 116 that, with respect to the PLC circuit 108, provides an equal but opposite voltage input to each of the PLC transducer elements in the RLG assembly 112. As further discussed below with respect to FIG. 2, the PLC circuit 108 controls a total path length and the RDI circuit 110 substantially minimizes the backscatter within an internal laser cavity of the RLG assembly 112.

FIG. 2 is a block diagram of an embodiment of the RLG assembly 112 of FIG. 1. The RLG assembly 112 comprises PLC driver assemblies 202 and 204, a readout photodetector 206, an PLC photodetector 210, and a laser cavity path length 208. The laser cavity path length 208 (indicated in FIG. 2 with dashed lines) is the total length of the triangular path formed by mirrors 212 (mirror "A"), 214 (mirror "B"), and 216 (mirror "C") located at the three corners of RLG assembly 112 as shown in FIG. 2. Mirrors "A" and "B" are single axis adjustable position mirrors attached to the PLC driver assemblies 202 and 204. The PLC driver assemblies 202 and 204 are controlled by the PLC circuit 108 and the RDI circuit 110 of FIG. 1. In the example embodiment of FIG. 2, the fixed position mirror "C", combined with the two adjustable position mirrors "A" and "B", are used to complete a closed triangular low loss retraceable beam path to reflect light around the laser cavity path length 208 (for example, the closed ring light path essential to obtain a gain greater than a loss such that light amplification is possible). The laser cavity path length 208 is an essential element and is easily accomplished by those skilled in the art of ring laser design. The PLC driver assemblies 202 and 204 maintain the laser cavity path length 208 at a precise integer multiple of a gas laser wavelength for the RLG assembly 112 (for example, HeNe 0.63 um), as further described in detail below with respect to FIG. 3.

In the example embodiment of FIG. 2, the PLC driver assemblies 202 and 204 comprise a composite of electrodes, a base plate, and piezoelectric transducers all bonded into a multi-layered stack of various materials. Moreover, the piezoelectric transducers in the PLC driver assemblies 202 and 204 are used to position the adjustable mirrors "A" and "B" as discussed below. With any temperature changes of the RLG assembly 112, the piezoelectric transducers in the PLC driver assemblies 202 and 204 change shape in response to an applied control voltage. In one implementation, the piezoelectric transducers adjust the adjustable mirrors 212 and 214 in order to maintain the laser cavity total path length 208 at a substantially fixed length. Additionally, long dormancy (non-operating) periods provide for stress relaxation in the multi-layered material stack of the PLC driver assemblies 202 and 204. The driver material relaxation results in a change in the PLC voltage. Knowledge of this PLC voltage change is required at the next turn-on in order for the RLG 104 to operate in the desired calibrated mode.

Mode Identification

During operation of the RLG assembly 112, a first amount of laser beam power (for example, up to two parts per million) exits the fixed mirror "C" 216 for measurement by the PLC photodetector 210. The PLC voltage source 114 of FIG. 1 adjusts the PLC driver assemblies 202 and 204 in order to control the laser cavity path length 208 such that a first amount of laser beam power from the PLC photodetector 210 is at a prescribed power value. In the example embodiment of FIG. 2, the first amount of laser beam power is at the prescribed power value when the laser cavity path length 208 is adjusted to a precise integer multiple of the gas laser wavelength (for example, HeNe 0.63 um). In one implementation, the laser cavity path length 208 operates at a plurality of integer wavelengths. As mentioned above, periods of dormancy lead to the relaxation of internal stresses within the PLC driver assemblies 202 and 204. This relaxation results in the PLC voltage shift that is needed at the next turn-on in order to achieve operation on the calibrated PLC mode. Moreover, if the PLC voltage shift in the total path length 208 exceeds one half of a wavelength, then operation on an adjacent mode will occur, and accordingly causes a discrete shift in the scale factor for the RLG assembly 112.

Referring back to FIG. 1, the RDI circuit 110 is a second control loop which conditions an AC component of the output signal from the PLC photodetector 210 to provide an RDI feedback signal. The RDI feedback signal has an amplitude that is a function of the total laser beam scatter associated with the mirrors 212, 214, and 216 that form the laser cavity path length 208. The RDI feedback signal is the result of at least two counter-rotating laser beam transient interactions that occur during angular rotation of the RLG assembly 112. In one implementation, the at least two counter-rotating beams pull together as their respective beam frequencies are equal when an input rate crosses zero. The equal beam frequencies result in an increasing AC component on the first amount of laser beam power from the PLC photodetector 210 (for example, a single beam signal, or SBS). The amplitude of SBS varies with the amount of total cavity scattering that occurs at the mirrors 212, 214, and 216. For example, the RDI circuit 110 uses the total cavity scatter indicating SBS as a feedback signal to translate the mirror 212 inward (outward) and the mirror 214 an equal but opposite distance outward (inward) until the SBS amplitude is at a prescribed amplitude value. The RDI does not change the laser cavity path length 208 due to the equal and opposite translation of the mirrors 212 and 214 (that is, the laser cavity path length 208 maintains the fixed total path length).

In at least one embodiment, the RDI circuit 110 is an integrating analog servo control loop which provides differential control for the mirrors 212 and 214 in order to substantially reduce the SBS. In at least one alternate embodiment, the RDI circuit 110 uses a D/A converter in the data processor 106 to control differential mirror position for the mirrors 212 and 214. In addition, an internal analog to digital (A/D) converter in the RDI circuit 110 measures the amplitude of SBS. The data processor 106 sends at least one incremental voltage command to move the mirrors 212 and 214, repositioning the mirrors 212 and 214 until the amplitude of SBS is at the prescribed amplitude value.

In one implementation, the RDI circuit 110 responds to PLC mode errors in a prescribed manner to detect operation of the laser cavity path length 208 at the desired calibrated length or if the laser cavity path length 208 is operating at an adjacent lower integer wavelength (−1 mode) or at an adjacent higher integer wavelength (+1 mode). As discussed above, operating the laser cavity path length 208 at a mode other than the calibrated mode results in a scale factor shift in the precision angle output of the RLG 104. For example, when the data processor 106 detects the +1 mode shift, the PLC circuit 108 compensates for the mode shift by subtracting from the scale factor a known discrete amount. When the data processor 106 detects the −1 mode shift, the PLC circuit 108 compensates by adding a known discrete amount to the scale factor. In a second example, the data processor 106 detects the +1 mode shift and re-initiates a PLC mode acquisition. The re-initiated PLC mode acquisition applies the −1 mode offset to the PLC voltage applied to the PLC driver assemblies 202 and 204 in order to achieve operation on the calibrated mode. In a third example, the data processor 106 detects the −1 mode shift and re-initiates the PLC mode acquisition by applying the +1 mode offset to the PLC voltage applied to the PLC driver assemblies 202 and 204 in order to achieve operation on the calibrated mode.

Periodic Mode Tracking

During a factory build and test process, a target PLC mode (for example, a calibrated laser cavity path length 208) is identified for the RLG assembly 112. The RLG 104 is typically subjected to at least one temperature cycle during a calibration process while operating in the target PLC mode. In one implementation, a RLG test equipment station (not shown) samples internal RLG measurements including a gyroscope temperature monitor and a PLC voltage monitor during the thermal cycles. In one embodiment, a least squares fit to the PLC voltage monitor and gyroscope temperature monitor measurements is performed in order to calculate the coefficients for a 3$^{rd}$ order polynomial temperature model (PTM). The PTM is a model of the PLC monitor voltage as a function of the gyroscope temperature. The purpose of the PTM is to estimate the PLC target mode voltage that the RLG 104 applies to the PLC driver assemblies 202 and 204 (for example, at an turn-on temperature measured during each RLG 104 turn-on in order to achieve operation in the target PLC mode). In one embodiment, the PTM is stored in the memory 107. The data processor 106 uses the PTM to calculate the PLC target mode voltage for the PLC driver assemblies 202 and 204. An example of the PTM used to determine the PLC target voltage is illustrated below in Equation 1.

$$V_{PLC} = M1 + M2*T + M3*T^2 + M4*T^3 \quad \text{(Equation 1)}$$

With respect to Equation 1 above, Mx (where x=1, 2, 3, or 4) represents the model coefficients for the target mode temperature model.

In one implementation, a prescribed mode tracking time interval that retains the target mode is developed based upon tests performed over different periods of dormancy. Testing includes briefly powering up the RLG 104 at increasing prescribed dormancy intervals to determine the correct PLC voltage bias needed to adjust the PTM to re-center the PLC drivers for the target mode (that is, to adjust the PLC voltage to maintain the target mode). A model for PLC voltage correction bias versus dormancy time interval is used to determine a prescribed mode tracking interval that the end user of RLG 104 will use in order to ensure the successful target acquisition of the correct PLC mode. At each prescribed mode tracking time interval, power is applied to the RLG 104 in order to assert the PLC target mode voltage at each of the PLC driver assemblies 202 and 204. In one embodiment, the internal D/A converter of the data processor 106 outputs the PLC target mode voltage to the PLC circuit 108. The periodic turn-on of the RLG 104 at the prescribed mode tracking time interval serves to significantly reset the internal stresses within the multi-layered stack of materials which comprise each of the PLC drivers 202 and 204. This periodic turn-on of the RLG 104 maintains the accuracy of the PTM used to produce the PLC target mode voltage. In prior teachings, a PLC driver voltage drift of less than ½ mode over a dormant interval was required in order that the PLC circuit 110 could successfully close on the target mode. In at least one embodiment discussed here, closure on the target mode can be achieved when the PLC driver voltage drift remains less than ½ modes (for example, a tolerance for PLC driver drift increases by a factor of three). In at least one alternate embodiment, the data processor 106 detects a mode shift and accurately re-compensates the RLG scale factor for operation on the acquired mode. The mode tracking time interval increases significantly such that RLG system applications that incorporate the IMU 102 of FIG. 1 avoid the life cycle costs and the handling product safety concerns associated with removing the IMU 102 for re-calibration.

The PLC circuit 108 maintains the laser cavity path length 208 at the prescribed signal intensity (for example, a prescribed laser beam power). Accordingly, the RDI circuit 110 maintains positions of the mirrors 212 and 214 at a prescribed scatter point position to substantially reduce cavity back scattering of the RLG assembly 112. Reductions in cavity back scattering decrease variations in RLG noise, bias, and scale factor performance. In one implementation, the PLC voltage measurements are recorded at room temperature for four different PLC modes in the RLG 104, resulting in a database of PLC and RDI voltages at four individual PLC target mode measurements as further illustrated in the example below with respect to Table 1.

TABLE 1

Scale Factor Compensation Values using Modeled PLC & RDI Measurements

| RLG 104 Samples | Initial PLC Voltage (V) | Final PLC Voltage (V) | Initial RDI Voltage (V) | Final RDI Voltage (V) | Δ PLC (V) | Δ RDI (V) |
|---|---|---|---|---|---|---|
| 1 | 2.881 | 2.471 | 2.430 | 2.822 | −0.410 | 0.392 |
| 2 | 2.891 | 2.549 | 2.607 | 2.176 | −0.342 | −0.431 |
| 3 | 2.940 | 2.583 | 2.548 | 2.920 | −0.357 | 0.372 |
| 4 | 2.930 | 2.598 | 2.626 | 2.274 | −0.332 | −0.353 |

With respect to Table 1 above, the data processor 106 calculates the delta PLC and delta RDI voltages for the RLG 104 operating one mode peak away from the initial for each of the four RLG 104 sample devices listed above in Table 1. The final PLC voltages are recognized as a PLC voltage change that corresponds to a typical volts/mode (VPM) value (in the case of Table 1, approximately 0.4 VPM). The data processor 106 performs mode recognition by comparing the measured PLC and RDI voltages from the RLG 104 to a temperature model based upon initial voltage values from a system calibration of the RLG 104. In one implementation, a small shift (for example, less than ⅜ mode, or approximately 0.15 V) in the PLC voltage indicates a high probability of operation on the calibrated mode. Moreover, the delta PLC shift (illustrated in Table 1 above) that matches the VPM value (0.4 VPM) indicates a different mode. The delta of the PLC shift of Table 1 above is further confirmed with a corresponding delta RDI shift (0.4 VPM) that reacquires the prescribed scatter point position for the RLG assembly 112.

In at least one implementation, long periods of dormancy result in the PLC driver voltage at a different value than at a calibration procedure during the factory build and test process. When the PLC driver voltage exceeds a prescribed threshold (for example, varies by more than 0.15 V), the data processor 106 examines the RDI voltage of the RDI circuit 110. For example, when the RDI voltage difference is larger in magnitude than 0.2 V but less than 0.6 V, the target PLC mode is considered to have shifted. In one implementation, the direction of the PLC mode shift is determined by the sign of the PLC voltage change. The data processor 106 uses a PLC scale factor compensation model (discussed below with respect to FIGS. 4 to 6) to compensate for the PLC voltage level change with a corrected scale factor. In one implementation, the data processor 106 uses the corrected scale factor to offset the PTM and correct the total path length. Once the total path length is corrected, the data processor 106 instructs the RLG 104 to restart in order to achieve accurate scale factor compensation. In at least one alternate embodiment, the data processor 106 offsets the scale factor coefficients to account for operation on an adjacent PLC mode.

The PLC circuit 108 compensates for changes in the laser cavity path length 208 using the methods discussed above. The PLC circuit 108 maintains the RLG assembly 112 on the target mode over the prescribed temperature range by tuning the PLC driver voltage for the target mode. The RDI circuit 110 substantially reduces the cavity back scattering of the SBS within the RLG assembly 112. The RDI circuit 110 detects and discriminates between operation on a target and each of the two adjacent PLC modes. When the RLG assembly 112 is dormant for a prescribed time period, the laser cavity path length 208 is subject to drift. In the example embodiment of FIG. 2, when the laser cavity path length 208 drifts by at least more than a ½ wavelength of light, the laser cavity path length 208 deviates at the next RLG 104 turn-on from a calibrated laser cavity path length, increasing the scale factor error of the RLG 104. The PLC circuit 108 controls the common mode position of mirrors 212 and 214 to ensure that the measurement signal from PLC photodetector 210 operates at a peak power level and at a substantially constant laser cavity path length 208. Returning the laser cavity path length 208 to the calibrated path length maintains the scale factor accuracy of the RLG 104.

FIG. 3 is a block diagram of an embodiment of a cavity backscatter model (CBM) of the RLG assembly 112. The CBM of FIG. 3 includes the (adjustable) mirrors 212 and 214 and the readout mirror 216. The RDI voltage shift behavior discussed above with respect to FIG. 2 is illustrated in the CBM of FIG. 3 as a RDI signal path displacement 302 (indicated as δ). To minimize undesirable beam back scatter within the RLG assembly 112, the PLC driver assemblies 202 and 204 adjust the mirrors 212 and 214 in response to the RDI feedback signal from the RDI circuit 110, resulting in the RDI optical path displacement 302. The laser cavity path length 208 is not affected by δ when the mirror 212 is adjusted in an equal and opposite direction from the mirror 214.

In the CBM of FIG. 3, a transverse shift 304 of the laser cavity path length 208 is at least one order of magnitude less than the laser spot size (beam diameter) on the mirrors 212 and 214. In the example embodiment of FIG. 3, backscatter variation accomplished by equal and opposite motion of the mirrors 212 and 214 is due to equal and opposite changes in phase for two out of the three backscatter components within the CBM of FIG. 3 rather than a significant relocation of the beam spot on a surface of the mirrors 212 and 214. The phase of the backscatter component between mirrors 212 and 214 is unchanged, while the phase of the other two components between the mirrors 212 and 214 and the fixed mirror 216 vary equally in magnitude but opposite in sign. This results in a periodic backscatter response that, for one embodiment of the triangular mirror placement shown in FIG. 3, repeats each time the RDI signal path displacement equates to a multiple of $\lambda/3^{1/2}$ (where λ is the wavelength of a HeNe ring laser). The RDI signal displacement value that corresponds to an RDI mode is referred to here as $\delta_{RDI}$.

In addition, a corresponding PLC signal displacement results in periodic laser power (mode) peaks when the moveable A and B mirrors are moved in a common direction (for example, both inward or both outward). For one embodiment of a triangular mirror placement this equates to a multiple of $\lambda/(2 \times 3^{1/2})$. The PLC signal displacement value that corresponds to a PLC mode is referred to here as $\delta_{PLC}$. Note that the ratio of $\delta_{RDI}$ to $\delta_{PLC}$ is ½, the significance of which is described below with respect to the examples of FIGS. 4, 5 and 6.

FIGS. 4, 5, and 6 are embodiments illustrating the operation of the RLG assembly 112 indicated generally as laser cavity path length models 400, 500, and 600, respectively. The model 400 illustrates the mirrors 212 and 214 in original positions in the target PLC mode, with the mirror 216 in a stationary position. In the example embodiment of FIG. 4, the laser cavity path length 208 is at a nominal (that is, a calibrated) length. In the model 500, the mirrors 212 and 214 have each moved inward by a displacement value that equates to $\delta_{PLC}$ (that is, a −1 PLC mode change). Movement of each of the mirrors 212 and 214 as illustrated in the model 500 results in the laser cavity path length 208 modified as a laser cavity path length 502. The laser cavity path length 502 is altered from the laser cavity path length 208 and requires a prescribed RDI correction to return the SBS feedback signal back to the prescribed level (that is, a correction to RDI mirror tuning to minimize cavity back scatter). In this embodiment, the impact of a single PLC mode shift to the RDI loop equates to tuning the RDI displacement value ½ RDI mode away from the prescribed SBS feedback signal value.

In the model 600, the RDI circuit 110 applies the prescribed RDI correction to the laser cavity path length 602 by instructing the PLC driver assemblies 202 and 204 to move the mirror 212 outward by an RDI displacement value of $\delta_{RDI}/2$ (for example, returning to an original position) and to move the mirror 214 inward by an RDI displacement value of $\delta_{RDI}/2$ (for example, 1 full RDI displacement value away from an original position) as shown in FIG. 6. Note that the voltage required to produce $\delta_{RDI}/2$ RDI displacement value equates to the same voltage that is required to move one $\delta_{PLC}$ PLC displacement value. For example, a 0.4 volt PLC monitor shift due to a single PLC mode shift will cause a 0.4 volt RDI monitor shift to correct for the ½ RDI mode shift which accompanies any single PLC mode shift. The (now-adjusted) laser cavity path length 602 is corrected to minimize the backscatter components present within the model 600. The shifted laser cavity path length 602 remains in disagreement with the laser cavity path length 502 such that the RLG 104 remains tuned −1 PLC modes away from the calibrated laser cavity path length 208 as shown in FIG. 6. Moreover, models 400, 500, and 600 illustrate the basis of the predictive behavior for the PLC and RDI displacement values resulting from a −1 (+1) PLC mode shift and a prescribed RDI correction. The predictive behavior for the PLC and RDI displacement values in response to a −1 (+1) PLC mode shift is detected by the present invention, and provides information used by the present invention to restore accurate RLG scale factor performance.

FIG. 7 is a flow diagram illustrating a method 700 for maintaining measurement accuracy in the RLG 104 of FIG. 1. The method of FIG. 7 begins at block 701. The method 700 addresses mode shift detection and applies correction in the RLG 104. In one implementation of FIG. 7, the data processor 106 at an RLG turn-on measures the PLC and RDI mirror control voltages in the RLG 104 over a prescribed temperature range and detects behavior that indicate a mode shift has occurred. Based on a detected mode shift, the data processor 106 applies a correction factor to the path length control voltage such that the laser cavity path length 208 is tuned to operate the RLG 104 on a target mode. The target mode on the RLG 104 substantially maintains scale factor performance within the RLG assembly 112 over the prescribed temperature range.

In one implementation, (optional) block 702 determines a prescribed mode tracking interval. Once the prescribed mode tracking interval occurs (optional block 704), the method 700 continues at block 706. In one or more alternate implementations, the prescribed mode tracking interval represents a periodic initialization turn-on of the RLG 104, and the method 700 starts at block 706.

At block 706, the RLG 104 measures temperature and uses a temperature model to calculate a voltage to apply to both of the PLC driver assemblies 204 and 206. At block 708, the RLG 104 is initialized to operate on the nearest mode based on the voltage calculated in block 706 and the achieved laser cavity path length 208. At block 710, the RLG 104 measures temperature and the actual closed loop PLC driver voltage applied for the achieved path length 208. If the achieved PLC driver voltage difference from the modeled PLC voltage exceeds a prescribed model capture tolerance level (block 712), the data processor 106 evaluates whether the RDI circuit 110 exceeds the model capture tolerance, indicating that an RDI mode shift has been detected at block 718. When the RDI mode shift is detected, the data processor 106 compensates with an PLC voltage correction value (block 716) based on the direction (sign) of the PLC driver voltage difference from the model. At block 714, the RLG 104 applies a corrected voltage to the PLC driver voltage based on the determined compensation in block 716. In one implementation, the compensation of FIG. 7 maintains the PLC of the RLG 104 such that the total path length at RLG turn-on does not deviate more than one half wavelength from a nominal (that is, the calibrated) path length. This allows the PLC circuit 108 to tune the driver voltage over the prescribed temperature range by adjusting a translatable mirror in each of the PLC driver assemblies 204 and 206 to ensure that the RLG 104 maintains the laser cavity path length 208 in the target mode (block 720) each time the RLG 104 is started.

The methods and techniques described herein may be implemented in a combination of digital electronic circuitry and software (or firmware) residing in a programmable processor (for example, a special-purpose processor or a general-purpose processor in a computer). An apparatus embodying these techniques may include appropriate input and output devices, a programmable processor, and a storage medium tangibly embodying program instructions for execution by the programmable processor. A process embodying these techniques may be performed by a programmable processor executing a program of instructions that operates on input data and generates appropriate output data. The techniques may be implemented in one or more programs that are executable on a programmable system including at least one programmable processor coupled to receive data and instructions from (and to transmit data and instructions to) a data storage system, at least one input device, and at least one output device. Generally, a processor will receive instructions and data from at least one of a read only memory (ROM) and a random access memory (RAM).

Machine-readable media suitable for tangibly embodying computer program instructions and data include all forms of non-volatile memory, and include by way of example, semiconductor memory devices; ROM and flash memory devices; magnetic disks such as internal hard disks and removable disks; magneto-optical disks; optical disks such as compact disks (CDs), digital video disks (DVDs), and other computer-readable media. Any of the foregoing may be supplemented by, or incorporated in, specially-designed ASICs. When information is transferred or provided over a network or another communications connection (for example, either hardwired, wireless, or a combination of hardwired and wireless) to a computer, the computer properly views the connection as a computer-readable medium. Thus, any such connection is properly termed a machine-readable medium. Combinations of the above are also included within the scope of computer-readable media.

This description has been presented for purposes of illustration, and is not intended to be exhaustive or limited to the form (or forms) disclosed. Furthermore, the embodiments disclosed are intended to cover any modifications, adaptations, or variations which fall within the scope of the following claims.

What is claimed is:

1. A method for maintaining measurement accuracy of a ring laser gyroscope, the method comprising:
    after the ring laser gyroscope starts, measuring a path length control voltage in the ring laser gyroscope over a prescribed temperature range;
    when a first path length controlled by the path length control voltage deviates from a calibrated path length, detecting the change in the path length;
    using a random drift improvement voltage change to confirm that a path length control mode shift has occurred; and
    for each confirmed path length control mode shift, applying a path length correction to maintain the first path length at the calibrated path length over the prescribed temperature range.

2. The method of claim 1, wherein periodically measuring the path length comprises tracking differences in the path length control voltage during a prescribed time period.

3. The method of claim 1, wherein detecting the change in the path length further comprises compensating for the path length control mode shift with a correction value based on the direction of the path length control mode shift when the path length control voltage exceeds a prescribed voltage threshold.

4. The method of claim 1, wherein applying the path length correction comprises correcting the first path length to operate the gyroscope on a calibrated exact total integer number of wavelengths.

5. The method of claim 1, wherein applying the path length correction comprises correcting a measurement signal output of the gyroscope by adjusting a calibrated scale factor depending on an actual integer number of wavelengths achieved during the path length control mode shift.

6. A method for maintaining measurement accuracy of a ring laser gyroscope, the method comprising:
    periodically starting the ring laser gyroscope and measuring a path length control voltage over a prescribed temperature range;
    when a change in the measured path length control voltage exceeds a prescribed model capture tolerance level, detecting the change in the path length control voltage;
    using a random drift improvement voltage change to confirm that a path length control voltage shift has occurred;
    for each confirmed path length control voltage shift, applying a correction offset to the path length control voltage such that a laser cavity path length controlled by the path length control voltage does not deviate from a calibrated laser cavity path length; and
    tuning the path length control voltage to operate the ring laser gyroscope on a target calibrated mode when the ring laser gyroscope is started over the prescribed temperature range.

7. The method of claim 6, wherein periodically measuring the cavity path length comprises activating a path length control voltage driver in at least two path length control driver assemblies that comprise the laser cavity path.

8. The method of claim 6, wherein applying the correction offset to the path length control voltage further comprises tracking differences in the path length control voltage over the prescribed temperature range.

9. The method of claim 8, wherein tracking differences in the path length control voltage comprises compensating for a mode shift with a correction value based on the direction of the mode shift.

10. The method of claim 6, wherein tuning the path length control voltage comprises adjusting at least one translatable mirror in the ring laser gyroscope to return the laser cavity path length to a calibrated path length.

11. An inertial measurement unit, comprising:
    a ring laser gyroscope, including:
        a laser cavity path that extends from a readout mirror,
        at least two path length control mirrors positioned within the laser cavity path operable to adjust a first length of the laser cavity path, and
        a data processor, wherein the data processor comprises program instructions that:
            periodically measure the first length achieved at a predetermined mode tracking time interval over a prescribed temperature range;
            detect changes in the first length as a path length control voltage shift;
            for each path length control voltage shift, using a random drift improvement voltage change to confirm that the path length control voltage shift is a path length control mode shift; and
            for each confirmed path length control mode shift, adjust a scale factor for the ring laser gyroscope based on the direction of the path length control mode shift to maintain calibrated performance accuracy similar to operation on a calibrated laser cavity path length.

12. The measurement unit of claim 11, and further comprising:
    a path length control circuit in operative communication with the data processor, the path length control circuit including a path length control voltage source; and
    a random drift improvement circuit in operative communication with the data processor and coupled to the at least two path length control mirrors, the random drift improvement circuit including a random drift improvement voltage source.

13. The measurement unit of claim 12, wherein the at least two path length control mirrors are periodically adjusted by piezoelectric transducers coupled to the path length control circuit.

14. The measurement unit of claim 11, wherein the data processor is at least one of a microcontroller, an application-specific integrated circuit, a field-programmable gate array, a field-programmable object array, and a programmable logic device.

15. The measurement unit of claim 11, wherein the program instructions that periodically measure the first length cause the data processor to compensate for the path length control mode shift with a correction offset value based on the direction of the path length control mode shift.

16. The measurement unit of claim 11, wherein the program instructions that detect changes in the first length further cause the data processor to compensate for the path length control mode shift with a correction value based on the direction of the path length control mode shift when a path length control voltage exceeds a prescribed voltage threshold.

17. The measurement unit of claim 11, wherein the program instructions that adjust the scale factor cause the data processor to tune the first length to achieve the calibrated laser cavity path length over the prescribed temperature range.

18. The measurement unit of claim 17, wherein the program instructions that tune the first length cause the data processor to adjust at least one of the path length control mirrors to return the first length to the calibrated laser cavity path length.

19. The measurement unit of claim 11, wherein the program instructions that adjust the scale factor cause the data processor to apply a correction to a measurement signal output of the ring laser gyroscope by adjusting a calibrated scale factor depending on an actual integer number of wavelengths achieved during the path length control mode shift.

20. The measurement unit of claim 11, wherein the inertial measurement unit is connected to an aircraft, marine, ground-based, or space-based guidance and navigation system.

* * * * *